(12) United States Patent
Naito et al.

(10) Patent No.: US 6,227,721 B1
(45) Date of Patent: May 8, 2001

(54) OPTICAL CONNECTOR

(75) Inventors: Katsuyoshi Naito; Tsutomu Nakamura, both of Tokyo; Hironao Hakogi, Kawasaki; Masahiro Tsuchida; Tateomi Matsumoto, both of Tokyo, all of (JP)

(73) Assignees: Oki Electric Industry Co., Ltd., Tokyo; Fujitsu Limited, Kawasaki; Hirose Electric Co., Ltd., Tokyo; Sumitomo Electric Industries, Ltd., Osaka, all of (JP)

( * ) Notice: Subject to any disclaimer, the term of this patent is extended or adjusted under 35 U.S.C. 154(b) by 0 days.

(21) Appl. No.: 09/251,446

(22) Filed: Feb. 17, 1999

(30) Foreign Application Priority Data

Feb. 24, 1998 (JP) .................................................. 10-041484

(51) Int. Cl.[7] ...................................................... G02B 6/36
(52) U.S. Cl. ................................................ 385/78; 385/84
(58) Field of Search .................................. 385/78, 60, 62, 385/66, 68, 84

(56) References Cited

U.S. PATENT DOCUMENTS

| 4,930,193 | 6/1990 | Baker . |
|---|---|---|
| 5,166,995 | 11/1992 | Briggs et al. . |
| 5,253,315 | * 10/1993 | Fentrss ................................. 385/783 |
| 5,313,540 | * 5/1994 | Ueda et al. ............................ 385/78 |
| 5,398,295 | * 3/1995 | Chang et al. ......................... 385/58 |

FOREIGN PATENT DOCUMENTS

| 28 32 839 A1 | 2/1980 | (DE) . |
|---|---|---|
| 0 225 687 A1 | 6/1987 | (EP) . |
| 0 766 111 A1 | 4/1997 | (EP) . |
| 9-43453 | 2/1997 | (JP) . |
| 9-211276 | 8/1997 | (JP) . |
| 9-265026 | 10/1997 | (JP) . |

* cited by examiner

Primary Examiner—Hung N. Ngo
(74) Attorney, Agent, or Firm—Evenson, McKeown, Edwards & Lenahan, P.L.L.C.

(57) ABSTRACT

An optical connector comprises a housing having a ferrule holding portion for holding a ferrule to be connected to an optical fiber, wherein said ferrule is equipped with a split sleeve for implementing an alignment with a ferrule of a mate connector, and said ferrule holding portion has a ferrule holding through passage which allows said ferrule to be received along the direction of ferrule diameter, allows said split sleeve to be inserted along the axial direction of said sleeve, and allows said ferrule to be installed into and held to said housing.

6 Claims, 3 Drawing Sheets

OPTICAL CONNECTOR

BACKGROUND OF THE INVENTION

1. Field of the Invention

The present invention relates to an optical connector, in particular, to an optical connector as an optical connecting device to be connected to a small-sized optical component which is, like an optical semiconductor module used in an optical fiber communication system and others, fixed to a board.

2. Description of Prior Art

There have been developed and used various types of optical connectors and some of them are disclosed in Japanese Patent Provisional Publications No. 211276 of 1997, No. 43453 of 1997, and No. 265026 of 1997. Among them, in an embodiment where an optical semiconductor module disclosed in Japanese Patent Provisional Publication No. 211276 of 1997 and an optical connecting device using the optical semiconductor module are employed, the embodiment has an optical semiconductor module, which has a package body accommodating a semiconductor laser and an optical fiber optically coupled thereto and double side walls respectively provided with a recess and formed in the traveling way of the laser light radiated from the semiconductor laser, and a simplified connector to be coupled with said module, having a recess in the inner wall holding a ferrule to which one end of the optical fiber is fixed, and being provided at its front end with a protuberance, and optical fibers are optically coupled with each other through the coupling of the ferrules by coupling the simplified connector with the optical semiconductor module.

Though these conventional optical connectors are suitable, to some extent, for producing a large amount of low-cost and small-sized modules indispensable in optical fiber communication systems, they usually still have some following problems. That is to say, to install a ferrule assembly into a conventional optical connector, a ferrule assembly to be installed is usually inserted from rear end of the housing and moved to the front end of the housing. In this assembling method, a stopper must be placed at the rear end of the housing after the installation and this means the increase in the number of components and the complexity of the retaining structure. Further, the installation itself is not easy and the ferrule once installed is difficult to remove.

An object of the present invention is to provide an optical connector allowing the conventional technological problems described above to be eliminated.

SUMMARY OF THE INVENTION

According to an aspect of the present invention, there is provided an optical connector provided with a housing having a ferrule holding portion for holding a ferrule to be connected to an optical fiber, wherein said ferrule is equipped with a split sleeve for implementing an alignment with a ferrule of a mate connector, and said ferrule holding portion has a ferrule holding through passage which allows said ferrule to be received along the direction of ferrule diameter, allows said split sleeve to be inserted along the axial direction of said sleeve, and allows said ferrule to be installed into and held to said housing.

According to an embodiment of the present invention, the ferrule of the optical connector is provided with a flange portion, and said housing is provided with a retaining portion which engages with said flange portion in the vicinity of said ferrule holding through passage so that said ferrule is prevented from rotating or getting off.

According to another embodiment of the present invention, in the optical connector a protuberance or a recess for preventing a wrong coupling is provided to the vicinity of said ferrule holding portion of said housing.

Referring to the attached drawings, an embodiment of the present invention will hereafter be described in details.

DESCRIPTION OF THE PREFERRED EMBODIMENTS

Figure 1:
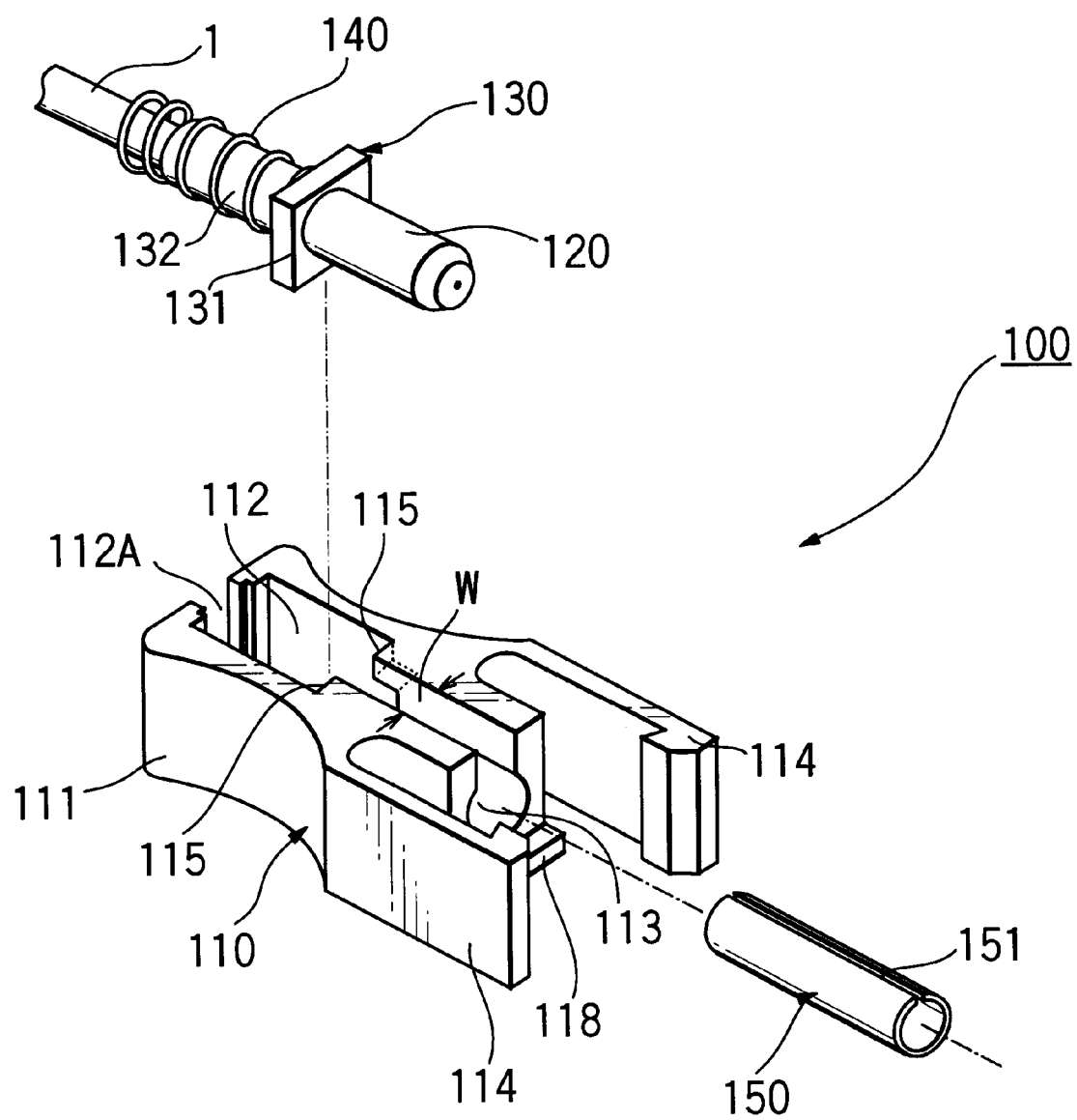
FIG. 1 is a perspective and exploded view of an optical connector as an embodiment of the present invention.

FIG. 1 is a perspective and exploded view, illustrating an optical connector as an embodiment of the present invention. An optical connector 100, as shown in FIG. 1, comprises a housing 110 mainly made of such as plastic, a ferrule 120 for an optical fiber of an optical cable 1 to be connected, a flange portion 130 for holding the ferrule 120, a coil-like deflection spring 140 and a split sleeve 150 for aligning the ferrules with each other.

Figure 2:
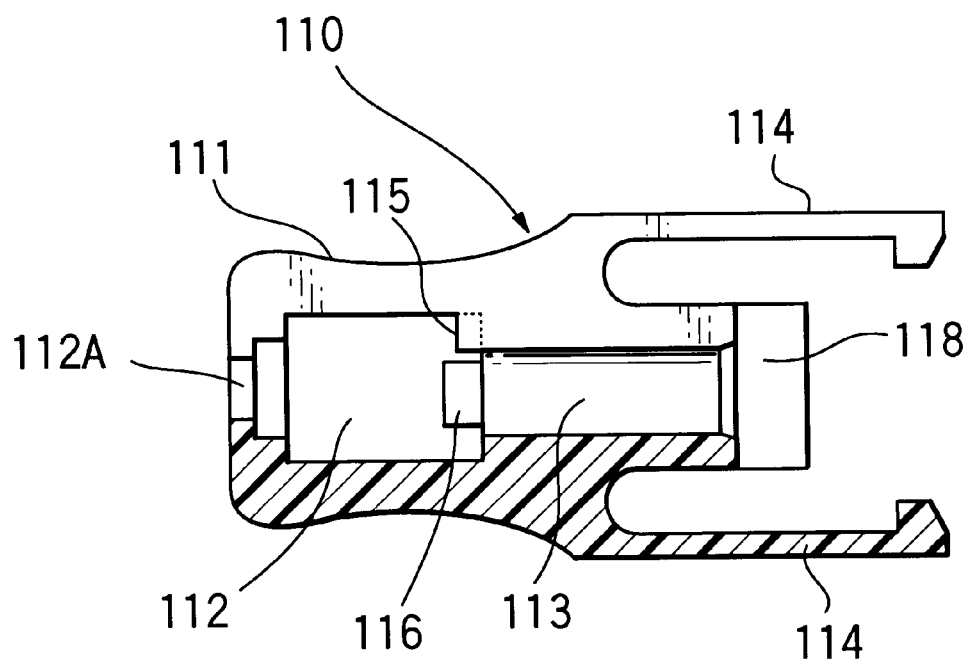
FIG. 2 is a partial cross sectional plan view of a housing of the optical connector of FIG. 1.

FIG. 2 is a sectional view of the housing 110 of the optical connector 100, and the structure of the housing 110 will be detailed with the reference to FIG. 1 and FIG. 2. The housing 110 has at its rear part a holding portion 111 formed to be easily held by two fingers (for example, a thumb and an index finger) and this holding portion 111 has at its middle part a hollowed space 112 for accommodating a ferrule assembly comprising the ferrule 120, the flange portion 130, and the deflection spring 140 (hereafter referred to as a ferrule assembly accommodating space 112), both or one of the top and bottom of the space 112 being open. The central part of the rear end of the ferrule assembly accommodating space 112 is provided with an opening 112A through which the optical cable 1 is allowed to extend out. The housing 110 has at its virtually middle part a through passage 113, which is formed to communicate with the ferrule assembly accommodating space 112 and whose inner diameter is large enough to hold the front end part of the ferrule 120 and the rear end part of a split sleeve 150 (hereafter referred to as a ferrule holding through passage 113). For this ferrule holding through passage 113, the housing has a pair of elastic arms 114 for locking the mate connector (hereafter referred to as lock elastic arm 114) on the side of and the outer side of the mate connector.

The through passage 113 for allowing the ferrule to be held therein and to pass therethrough, whose structure is clearly detailed in a perspective view of FIG. 1, is nearly a round through hole whose upside portion is formed to be open in a predetermined width W This predetermined width W is designed to be a little wider than the diameter of the ferrule 120, but narrower than the outer diameter of the split sleeve 150 equipped to the ferrule 120. Further, on both upper sides of the end part of the ferrule holding through passage 113 of the ferrule assembly accommodating space 112, a pair of protuberant portions 115 are formed to serve as a retaining portion for preventing the ferrule from rotating or getting off, which will later be described, and at the lower middle lower part of said the end part, a protuberant piece 116 is also formed, as clearly shown in FIG. 2, to serve as another retaining portion for preventing the ferrule from rotating or getting off, which will be described later. Furthermore, as clearly shown in a perspective view of FIG. 1, the ferrule holding through passage 113 of the housing 110 has at its lower part of the front end a protuberant portion 118 for preventing wrong coupling which will be described later.

As clearly shown in FIG. 1, the lock elastic arm 114, formed as a cantilever allowed to elastically open a little outward, is integrated with the body of the housing 110. This lock elastic arm 114 has on the inner wall of its front part a lock protuberance for locking the coupled optical semiconductor module 200 as the mate connector.

Regarding a flange portion 130 composing the ferrule assembly clearly detailed in FIG. 1, the flange portion 130 of the present embodiment comprises a square flange 131 and a cylinder portion 132 extending backward. To this flange portion 130 is equipped and held the ferrule 120 with which the optical fiber of the optical cable 1 ordinarily is connected, and around the cylinder portion 132 of the flange portion 130 is equipped a coiled deflection spring 140 with its front end portion brought into contact with the backside of the flange 131.

As shown in a perspective view of FIG. 1, a split sleeve 150 which is made of zirconia or is stamped and bent out of a resilient metal sheet, is formed to be a cylinder whose inner diameter is a little smaller than the outer diameter of the ferrule 120, and has a slit 151.

Figure 3:
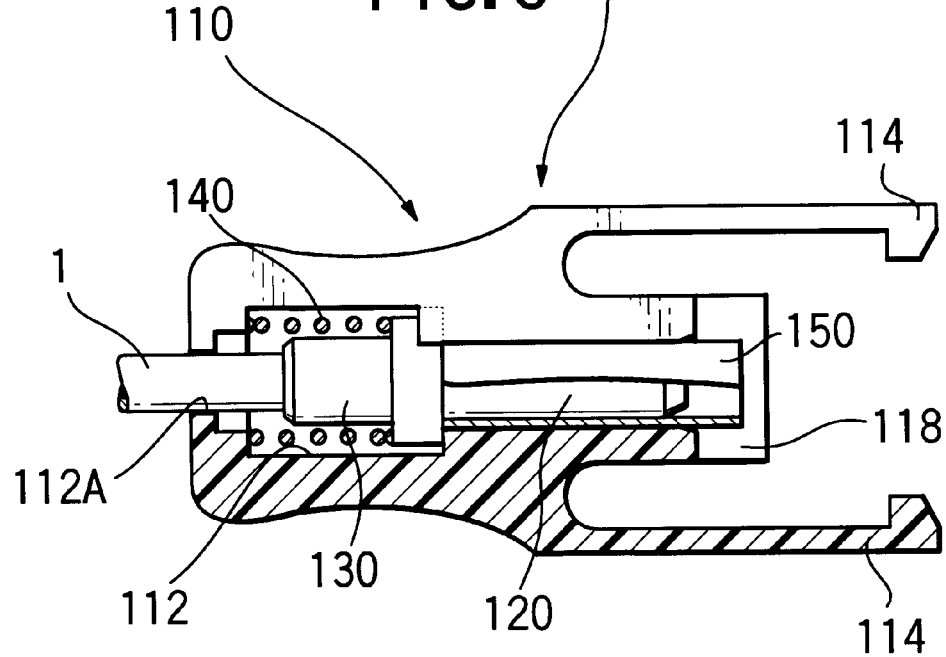
FIG. 3 is a partial cross sectional plan view showing how a ferrule assembly is installed in the housing of the optical connector of FIG. 1.

How to assemble, operate and activate overall the optical connector 100 constituted and structured as above will hereafter be described. First, regarding how to assemble the optical connector 100, as shown in a perspective view of FIG. 1, the ferrule 120 with the optical cable 1 connected is installed into and fixed to the flange portion 130 and the deflection spring 140 is equipped around the cylinder portion 132. The ferrule assembly thus constructed is put into the ferrule assembly accommodating space 112 in such a way that the front portion of the ferrule 120 is allowed to be installed along the direction of the ferrule diameter into the ferrule holding through passage, the flange portion 130 is allowed to be installed into the ferrule assembly accommodating space 112, and the optical cable 1 is allowed to extend out of the opening 112A, while the deflection spring 140 is kept a little compressed. If the compressed deflection spring 140 is released when the upper edge of the flange 131 of the flange portion 130 has lowered below a pair of protuberant portions 115, the expanding force of the deflection spring 140 pushes the flange 131 of the flange portion 130 into the space between the protuberant portions 115 and the protuberant piece 116 and thereby brings the front side of the flange 131 into contact with the rear end of the ferrule holding through passage 113. In this condition, the deflection spring 140 is a little compressed between the backside of the flange 131 of the flange portion 130 and the rear inside wall of the ferrule assembly accommodating space 112, and produces a deflection force deflecting the ferrule 120 to be coupled. Then, toward the front end of the ferrule 120 which has thus been installed into the ferrule holding through passage 113, the rear end of the split sleeve 150 is installed into the ferrule holding through passage 113 along the direction of its axis line so that the rear end of the split sleeve 150 is equipped to the ferrule 120. At this moment the split sleeve 150 is a little expanded in its inner diameter and the resilient force due to the expansion allows the split sleeve 150 to be tightly equipped and held to the ferrule 120, and further the ferrule 120 inserted into the ferrule holding passage 113 is prevented from getting off because the outer diameter of the split sleeve 150 is a little larger than the predetermined width W of the upper part of the ferrule holding passage 113 described above. Furthermore, the flange portion 130 does not get off upward because it is held inside the ferrule assembly accommodating space 112 by the spring force of the deflection spring 140. FIG. 3 shows, in a partial cross sectional plan view, the ferrule assembly thus installed inside the housing 110.

Figure 4:
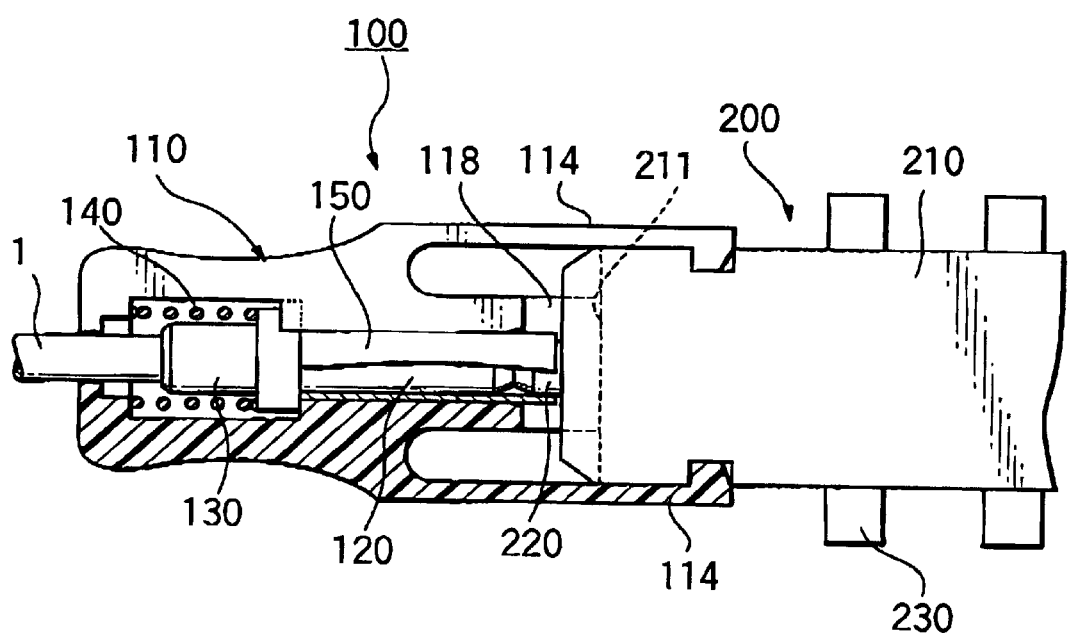
FIG. 4 is a partial cross sectional plan view showing how the optical connector and the optical semiconductor module of FIG. 1 are coupled with and lock each other.

Hereafter will be described how an optical connector equipped with a ferrule assembly to which an optical cable 1 is connected is operated and activated when the optical connector is coupled with an optical semiconductor module mounted, for example, on a printed circuit board of an appliance. To couple the optical connector 100 with the optical semiconductor module, an operator holds, for example, with his thumb and index finger, the holding portion 111 of the housing 110 of the optical connector 100 and the lock protuberance of the lock elastic arm 114 on both sides of the front portion of the housing 110 is elastically deflected a little outward by the protuberant ridge on the housing of the optical semiconductor module, and the lock protuberance is allowed to ride over the protuberant ridge, and at the moment when the ride-over has finished, the lock elastic arm 114 returns to its original closing position due to its own the elastic deflecting force. When the lock elastic arm 114 has been closed, the ferrules 120, 220 are correctly aligned with each other, and the optical connector 100 and the optical semiconductor module 200 are coupled with and lock up each other. FIG. 4 shows, in a partial cross sectional plan view, how the optical connector 100 and the optical semiconductor module are coupled with and locked up each other. Reference numerals 200, 210, and 230 designate an optical semiconductor module, a housing of an optical semiconductor module 200, and a plurality of connecting terminals surface-mounted on a conductor of a printed circuit board, respectively.

In this coupling condition, the ferrule 120 is prevented from rotating or getting off because the flange 131 of the flange portion 130 is retained by the protuberant portion 115 or the protuberant piece 116. Though the embodiment described above utilizes the effect that the square flange 131 engages with the protuberant portion 115 and the protuberant piece 116, the present invention allows various structures to be employed without being limited to this square flange. For example, not employing a simple square flange for the flange portion, such structure may be employed where a flange formed in a cross is allowed to fit into a groove which is formed, on the housing side, also in a cross corresponding to the cross flange.

As clearly shown in FIG. 4, for the coupling of the optical connector 100 and the optical semiconductor module 200, a protuberance 118 which is provided to the housing 110 of the optical connector 100 for preventing wrong coupling (hereafter referred to as a wrong coupling preventing protuberance 118), is designed to fit into a recess 211 which is formed at the lower front end of the housing 210 of the optical semiconductor module 200 for preventing wrong coupling (hereafter referred to as a wrong coupling preventing recess 211). Accordingly, an inverted optical connector 100 which is turned upside down never correctly fits into an optical semiconductor module 200. These protuberance and recess for preventing wrong coupling are interchangeable each other for the optical connector 100 and the optical semiconductor module 200.

Though a mate connector for an optical connector in the above embodiment has been described as an optical semiconductor module which is placed on a printed circuit board, the present invention may be applied to such a mate connector as the one to be connected to an optical cable, without being restricted to the embodiment hitherto described.

In an embodiment of the present invention, the ferrule assembly is installed into the housing along the direction of the ferrule diameter and the ferrule is prevented from getting off by a split sleeve which has been installed along the direction of its axis, and accordingly an optical connector of the present invention is very easy to construct, does not increase the number of components, and therefore is more inexpensive. Further the present invention allows the housing to be manufactured in a single piece and therefore the housing cost is more reduced.

Since a retaining portion for preventing the ferrule from rotating or getting off is arranged in the ferrule accommodating space, a stable coupling condition can always be kept without increasing the number of components.

Since an embodiment of the present invention has a protuberance or a recess for preventing a wrong coupling, a correct coupling is always allowed.

What is claimed is:

1. An optical connector provided with a housing having a ferrule holding portion for holding a ferrule to be connected to an optical fiber, wherein said ferrule is equipped with a split sleeve for implementing an alignment with a ferrule of a mating connector, and said ferrule holding portion has a ferrule holding through passage which allows said ferrule to be received alone the direction of ferrule diameter, allows said split sleeve to be inserted along the axial direction of said sleeve, and allows said ferule to be installed into a held to said housing, and said ferrule is provided with a flange portion, and said housing is provided with a retaining portion which engages with said flange portion in the vicinity of said ferrule holding through passage so that said ferrule is prevented from rotating or getting off.

2. An optical connector in accordance with claim 1, wherein a protuberance or a recess for preventing a wrong coupling is provided to the vicinity of said ferrule holding portion of said housing.

3. An optical connector provided with a housing having a ferrule holding portion holding a ferrule to be connected to an optical fiber, wherein said ferrule having a split sleeve for implementing mating alignment with a further connector ferrule, and said ferrule holding portion having a ferrule holding through passage with an opening along one side to allow said first-mentioned ferrule to be received into the through passage along the direction of a diameter of said first-mentioned ferrule and to allow an end portion of said split sleeve to be inserted into the passage way along an axial direction of said sleeve over an end of said first-mentioned ferrule, thereby preventing said first-mentioned ferrule from moving out of the through passage in a direction of a diameter of said first-mentioned ferrule.

4. An optical connector according to claim 3, wherein said ferrule is provided with a flange portion, and said housing is provided with a retaining portion which engages with said flange portion in the vicinity of said ferrule holding through passage so that said ferrule is prevented from rotating or getting off.

5. An optical connector according to claim 3, wherein a protuberance or a recess for preventing a wrong coupling is provided to the vicinity of said ferrule holding portion of said housing.

6. An optical connector according to claim 5, wherein said ferrule is provided with a flange portion, and said housing is provided with a retaining portion which engages with said flange portion in the vicinity of said ferrule holding through passage so that said ferrule is prevented from rotating or getting off.

* * * * *